United States Patent Office 3,411,924
Patented Nov. 19, 1968

3,411,924
METHOD OF MANUFACTURING A THREE-COMPONENT WATER - RESISTING BINDING AGENT
Pavel Vladimirovich Lapshin, Moscow, U.S.S.R., assignor to Nauchno-Issledovatelsky Institute Zhelezobetonnykh Izdely, Stroilelnykh i Nerudnyk Materialov, Moscow, U.S.S.R.
No Drawing. Filed June 2, 1964, Ser. No. 372,091
10 Claims. (Cl. 106—89)

ABSTRACT OF THE DISCLOSURE

This invention relates to the manufacture of three-component water-resisting binding agents on a base of gypsum, portland cement and diatomaceous earth (diatomite) as well as articles made therefrom. Cement containing portland cement or puzzolanic portland cement is introduced in a process of dehydration of diaqueous gypsum, the cement being fed into the gypsum-boiling kettle after the gypsum has reached a temperature above 100° C. If, for economic reasons, a cement not containing diatomaceous earth (diatomite) is used, such diatomaceous earth is introduced into the kettle either at the time of charging the diaqueous gypsum into the kettle, or during the process of its dehydration before cement charging. It is even possible to charge the diatomaceous earth (diatomite) after the cement has been charged but not before the transformation of the gypsum into hemihydrate.

---

This invention relates to the method of manufacturing a three-component water-resisting binding agent on the base of gypsum, portland cement and acid hydraulic admixtures. By the term "portland cement" is also included puzzolanic portland cement. The said agent is used for manufacturing different kinds of articles. This agent is produced by the following new method.

Calcium sulphate hemihydrate ($CaSO_4 \cdot \frac{1}{2}H_2O$) has found rather wide application in modern construction as a quite effective and high-quality building material. The most valuable properties of calcium sulphate hemihydrate are: rapid setting and high rate of hardening, conditioning high productivity of technological equipment used for moulding (casting) gypsum constructional elements and structures.

It is known, that wider use of calcium sulphate hemihydrate in construction works is hindered due to its insufficient water-resisting properties. This disadvantage makes it impossible to use gypsum material under high moisture conditions.

In order to impart required water-resisting properties to the gypsum binding material, it is necessary to add some active additives such as portland cement and diatomaceous earth (diatomite). This well-known three-component binding agent obtained by "cold mixing" of its components possesses water-resisting properties and preserves the ability of rapid setting and increased strength. Nevertheless, all the known methods of manufacturing three-component water-resisting binding agents by means of "cold mixing" of the components are rather complicated and of little use for re-equipping the existing gypsum-boiling plants. It would require installation of additional bulky machines and an increase in production floor space, thereby complicating the manufacturing process and increasing the unit cost of labour and power and essentially reducing the profitableness of the enterprise.

The object of the below-described new method of production of a three-component water-resisting binding agent on the base of gypsum, portland cement and diatomaceous earth (diatomite) is to eliminate the above-mentioned disadvantages of the existing methods. The purpose of the new method is to make use of the technological equipment of the existing gypsum-boiling plants, manufacturing calcium sulphate hemihydrate in gypsum kettles. Therefore in using these kettles no other additional equipment is needed except hoppers and weighing batchers for proportioning portland cement and diatomaceous earth (diatomite).

The primary object of the invention is to develop a method of producing a three-component binding agent, ensuring a considerable improvement of its properties, namely strength and water-resistance, the new method of manufacturing a three-component water-resisting binding agent ensuring a considerable reduction in unit cost of expensive cement additives.

The main novel feature of the proposed method of manufacturing a three-component water-resisting binding agent on the base of gypsum, portland cement and diatomaceous earth (diatomite) is, that the cement containing portland cement or puzzolanic portland cement is introduced in the process of dehydration of the diaqueous gypsum, the cement being fed into the gypsum-boiling kettle after the gypsum has reached the temperature about 100° C. If, for the purpose of economical use of raw material, it is reasonable to use cement not containing diatomaceous earth (diatomite), the latter is introduced into the kettle either at the time of charging diaqueous gypsum into the kettles, or in the process of its dehydration before cement charging, the latter, as in the first case, being introduced only when the temperature of gypsum is above 100° C.

Preference should be given to the above-stated order of introducing the components into the gypsum kettle for combined hot mixing. However, the diatomaceous earth (diatomite) may be introduced after the cement has been loaded into the kettle, but not before the transformation of gypsum into semiaqueous state.

Irrespective of the order of introducing diatomaceous earth (diatomite), cement loading is carried out in the process of dehydration of gypsum after the temperature of the latter is above 100° C.; hot mixing of the components in the kettle up to the yield temperature (125–170° C.) of the finished product represents the principal feature of the new proposed method.

As components of the above binding agent produced by the proposed method, slag portland cement may be used.

The presence of diatomaceous earth (diatomite) in the three-component binding agent prevents the destructive effect of hydrosulfo-aluminal compounds in the articles made of gypsum and cement.

In order to provide conditions in the kettle reducing the dehydration temperature of the diaqueous gypsum and increasing the medium moisture, an aqueous solution of chlorous salt of alkali metal or alkaline earth metal, or an aqueous solution of ferrous chloride in the amount of 0.1 to 0.4 percent of the dry weight of salt to the weight of the mixture in the kettle is introduced, the temperature in the kettle being from 80 to 100° C. An increase of the medium moisture in the gypsum kettle and simultaneous reduction of dehydration temperature of gypsum condition an increase in the yield of active modified semiaqueous gypsum, which permits to increase considerably the strength of the three-component water-resisting binding agent.

Cement is proportioned depending on the kind of the latter and the purpose of the three-component water-resisting binding agent in the range from 10 to 50 percent of the weight of the gypsum in semiaqueous state.

The diatomaceous earth (diatomite) is proportioned depending on its activity and the content of aluminous compounds in the cement clinker. The weight of this additive is to be from 40 to 150 percent of that of the clinker portion in the cement, irrespectively whether the additive is introduced in the process of cement production or loaded into the gypsum boiling kettle during the process of producing the three-component binding agent. For high alumina clinkers increased proportions are used, whereas for low alumina clinkers decreased ones are used. According to the invention the three-component water-resisting binding agent on the base of gypsum, portland cement and diatomaceous earth (diatomite) may be produced in the following manner.

Gypsum stone and diatomaceous earth (diatomite) are fed into the crusher in separate batches in proportion 4:1. The crushed mixture is discharged into the kettles.

When the temperature in the kettle reaches 105° C., a saturated solution of NaCl in the amount of 0.1% by weight of the mixture is introduced into the kettle, the boiling process being continued until the temperature of the mixture reaches 100–120° C. The duration of the boiling process from the time of feeding the mixture into the kettle is 35–40 min. After that cement in the amount of 14% by weight of the gypsum-diatomaceous earth mixture is introduced into the boiling mixture.

This operation lasts 5 min., then the three-component mixture is boiled until the boiling temperature reaches 125–140° C., after which the mixture is fed into a receiving bin.

The three-component water-resisting binding agent based on gypsum, portland cement and diatomaceous earth (diatomite) produced by the method described above possesses the following characteristics:

Initial water requirement (weight percent) ____ 50–53
Setting time:
  Initial setting time _____min__ 8–9
  Final setting _____min__ 16–18
Axial compression strength:
  After 1½ hrs. _____kg./cm.$^2$__ 50–60
  At a constant weight (dry.) ____kg./cm.$^2$__ 150–175
  In water-saturated state _____kg./cm.$^2$__ 90–110
  After drying up to constant
    weight _____kg./cm.$^2$__ 150–175

What is claimed is:

1. A method of manufacturing a three-component water-resisting binding agent by calcining powdered gypsum and diatomaceous earth in a gypsum-boiling kettle comprising, after the temperature is above 100° C. in said kettle adding a cement selected from the group consisting of portland cement and puzzolanic portland cement in an amount of 10–50% by weight of the gypsum hemihydrate derived from the charged gypsum, further mixing the mixture thus obtained and heating said mixture up to a temperature of 125–170° to obtain said binding agent, provided that the total weight of the diatomaceous earth present in the binding agent is from 40–150% by weight of the clinker portion of the selected cement.

2. A method as claimed in claim 1 wherein said diatomaceous earth is introduced as a constituent of said cement.

3. A method as claimed in claim 1 wherein said diatomaceous earth is introduced to said kettle prior to the addition of said cement.

4. A method as claimed in claim 1 wherein said diatomaceous earth is introduced after the addition of said cement but not before the gypsum transforms into hemihydrate.

5. A method of manufacturing a three-component water-resisting binding agent by calcining powdered gypsum and diatomaceous earth in a gypsum-boiling kettle comprising, adding an aqueous solution of at least one salt selected from a group consisting of ferrous chloride, chlorides of alkali metals and chlorides of alkaline earth metals in an amount of from 0.1–0.4% by dry weight of salt to the weight of the mixture in the kettle, then after the temperature is above 100° C. in said kettle adding a cement selected from the group consisting of portland cement and puzzolanic portland cement in an amount of 10–50% by weight of the gypsum hemihydrate derived from the charged gypsum, further mixing the mixture thus obtained and heating said mixture up to a temperature of 125–170° C. to obtain said binding agent, provided that the total weight of the diatomaceous earth present in the binding agent is from 40–150% by weight of the clinker portion of the selected cement.

6. A method as claimed in claim 5 wherein said diatomaceous earth is introduced as a constituent of said cement.

7. A method as claimed in claim 5 wherein said diatomaceous earth is introduced to said kettle prior to the addition of said cement.

8. A method as claimed in claim 5 wherein said diatomaceous earth is introduced after the addition of said cement but not before the gypsum transforms into hemihydrate.

9. Articles manufactured with the use of a three-component water-resisting binding agent produced by calcining powdered gypsum and diatomaceous earth in a gypsum-boiling kettle, after the temperature is above 100° C. in said kettle adding a cement selected from the group consisting of portland cement and puzzolanic portland cement in an amount of 10–50% by weight of the gypsum hemihydrate derived from the charged gypsum, further mixing the mixture thus obtained and heating said mixture up to a temperature of 125–170° C. to obtain said binding agent, provided that the total weight of the diatomaceous earth present in the binding agent is from 40–150% by weight of the clinker portion of the selected cement.

10. Articles manufactured with the use of a three-component water resisting binding agent produced by calcining powdered gypsum and diatomaceous earth in a gypsum-boiling kettle, adding an aqueous solution of at least one salt selected from a group consisting of ferrous chloride, chlorides of alkali metals and chlorides of alkaline earth metals in an amount of from 0.1–0.4% by dry weight of salt to the weight of the mixture in the kettle, then after the temperature is above 100° C. in said kettle, adding a cement selected from the group consisting of portland cement and puzzolanic portland cement in an amount of 10–50% by weight of the gypsum hemihydrate derived from the charged gypsum, further mixing the mixture thus obtained and heating said mixture up to a temperature of 125–170° C., to obtain said binding agent, provided that the total weight of the diatomaceous earth present in the binding agent is from 40–150% by weight of the clinker portion of the selected cement.

References Cited

UNITED STATES PATENTS

| | | | |
|---|---|---|---|
| 1,837,072 | 12/1931 | Sassur | 106—109 |
| 1,923,370 | 8/1933 | Hansen | 106—89 |
| 3,159,497 | 12/1964 | Yamaguch | 106—110 |

FOREIGN PATENTS

| | | |
|---|---|---|
| 513,897 | 10/1939 | Great Britain. |
| 513,901 | 10/1939 | Great Britain. |
| 895,398 | 5/1962 | Great Britain. |

TOBIAS E. LEVOW, *Primary Examiner.*

SAMUEL E. MOTT, *Assistant Examiner.*